United States Patent [19]

Kanbe et al.

[11] 4,247,629
[45] Jan. 27, 1981

[54] LIGHT-SENSITIVE PHOTOGRAPHIC ELEMENT COMPRISING A CYAN IMAGE DYE-PROVIDING COMPOUND

[75] Inventors: Masaru Kanbe; Kazumasa Watanabe; Morito Uemura; Jiro Takahashi; Ryuichiro Kobayashi; Tatsuhiko Kobayashi, all of Hino, Japan

[73] Assignee: Konishiroku Photo Industry Co., Ltd., Tokyo, Japan

[21] Appl. No.: 68,517

[22] Filed: Aug. 22, 1979

[30] Foreign Application Priority Data

Aug. 31, 1978 [JP] Japan ................... 53-106462

[51] Int. Cl.³ ............. G03C 1/40; G03C 1/10
[52] U.S. Cl. .................... 430/562; 430/223
[58] Field of Search ........... 430/222, 223, 225, 226, 430/562, 242

[56] References Cited

U.S. PATENT DOCUMENTS 3,942,987  3/1976  Landholm et al. ............ 430/223
4,013,635  3/1977  Landholm et al. ............ 430/223

Primary Examiner—Richard L. Schilling
Attorney, Agent, or Firm—Frishauf, Holtz, Goodman & Woodward

[57] ABSTRACT

A light-sensitive photographic element comprising a support and at least one light-sensitive silver halide emulsion layer coated thereon having associated therewith a cyan image dye-providing compound which releases a cyan dye or a precursor thereof corresponding to the imagewise exposure of said emulsion layer, said cyan image dye-providing compound being a compound represented by formula [I] or [II]:

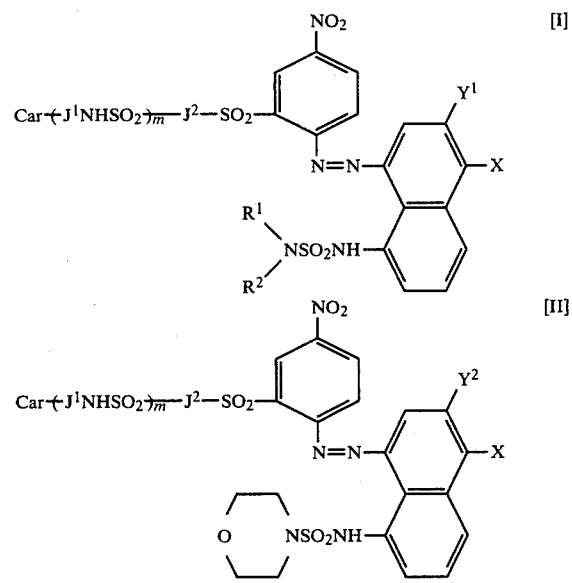

wherein Car, $R^1$, $R^2$, X, $Y^1$, $Y^2$, m, $J^1$ and $J^2$ are defined in the specification and claims.

17 Claims, No Drawings

LIGHT-SENSITIVE PHOTOGRAPHIC ELEMENT COMPRISING A CYAN IMAGE DYE-PROVIDING COMPOUND

This invention relates to a light-sensitive photographic element preferably for the use of color diffusion transfer process, which comprises a cyan image dye-providing compound. More particularly, this invention relates to a light-sensitive photographic element for the use of color diffusion transfer process, which comprises a non-diffusible cyan image dye-providing compound which can be oxidized by an oxidation product of a silver halide developing agent and can release a diffusible cyan dye or a precursor thereof under alkaline conditions (Dye Releasing Redox Compound, hereinafter referred to as "DRR compound"). In a color diffusion transfer process using a DRR compound (hereinafter referred to as "DRR process"), a light-sensitive layer comprising a light-sensitive silver halide emulsion layer, which is associated with a non-diffusible image dye-providing compound, i.e., DRR compound is subjected to imagewise exposure to form a latent image in said emulsion layer and then the light-sensitive layer thus exposed is processed with an alkaline processing composition in the presence of a silver halide developing agent. When processed with the alkaline processing composition, said light-sensitive layer and an image receiving layer are in a superposed state. Where an oxidation product of the silver halide developing agent is formed as a result of the processing by said alkaline processing composition, said DRR compound is oxidized with said oxidation product to release a diffusible dye or a precursor thereof. The diffusible dye or precursor thereof thus released from the DRR compound is transferred by diffusion to said image receiving layer, thereby forming dye image.

Since, in the DRR process, substance which is to be transferred to an image receiving layer is composed of only a diffusible dye portion or dye precursor portion of a DRR compound and does not include a silver halide developing agent portion, a p-phenylenediamine group compound is not necessarily used as a silver halide developing agent and, according to one of preferred embodiments, a silver halide developing agent which is used for black-and-white photography can be used. Accordingly, a dye image having less color stain can be obtained in this process. In this respect, DRR process is more advantageous as compared with a process in which a dye developer is used as described in British Pat. No. 804,971 and a process in which a non-diffusible image dye-providing compound, which is capable of releasing a diffusible dye or a precursor thereof on coupling reaction with a silver halide color developing agent oxidized by silver halide, is used as described in U.S. Pat. Nos., 3,227,550, 3,443,940 and 3,227,551, and British Pat. No. 904,365. Certain classes of DRR compounds and color diffusion transfer processes (DRR process) using those compounds are described, for example, in U.S. Pat. Nos. 3,245,789, 3,443,939, 3,443,940, 3,443,943, 3,698,897, 3,725,062, 3,728,113, 3,751,406, 3,844,785, 3,928,312, 3,929,760, 3,931,144, 3,932,380, 3,932,381, 3,942,987, 3,993,638, 3,954,476, 4,001,204 and 4,013,635; Research Disclosures 13024 (1975), 15157(1976), 16625(1978) and 16629(1978); Japanese Patent Publication Laid Open to Public Inspection [hereinafter referred as LOP] Nos. 50-118723/1975, 51-104343/1976, 51-113624/1976, 51-114930/1976, 52-7727/1977, 52-8827/1977, 52-106727/1977, 53-3819/1978, 53-3820/1978, 53-4544/1978, 53-23628/1978, 53-35533/1978, 53-46730/1978, 53-47823/1978, 53-50734/1978 and 53-66227/1978.

Although all of these conventional DRR compounds are valuable, a novel image dye-providing compound having more improved properties, i.e., color, diffusibility, mordantability, light-stability has been sought in the art.

The present inventors have studied and developed a series of new cyan DRR compounds which can most appropriately be used for a light-sensitive photographic element for color diffusion transfer process. The cyan DRR compounds of the invention releases diffusible dye or precursors thereof as a result of oxidation under alkaline conditions. The compound of the present invention is characterized, and is distinct from those compounds disclosed in U.S. Pat. Nos. 3,929,760, 3,942,987 and 4,013,635, in that it comprises an aminosulfonylamino group or a morpholinosulfonylamino group at the 5-position in relation to a substituent X in the naphthalene ring of azo dye portion and it also comprises, as hereinafter shown, a Car(J$^1$—NHSO$_2$)$_m$ J$^2$— at the 2-position in relation to azo group in the benzene ring of azo dye portion.

The compounds described in the specifications of U.S. Pat. Nos. 3,929,760, 3,942,987 and 4,013,635 do not satisfy all of the three performance requirements, i.e., color, light-stability and absorption spectrum over a wide range of pH, since either the light-stability and/or the absorption spectrum thereof is insufficient even if the color is excellent, or the color is insufficient even if the light-stability is excellent.

In contrast to those, the compounds according to this invention satisfy all of the three performance requirements.

The compound represented by general formula [I] shown below has necessarily a sulfamoyl group at the 2-position in relation to the substituent X in the naphthalene ring. Although the compound represented by general formula [II] shown below need not necessarily have a sulfamoyl group at the 2-position in relation to the substituent X in the naphthalene ring, a compound having the same is more excellent in light stability. These compounds have excellent hue and light-stability and hue-stability over a wide range of pH value.

Generally, a DRR compound should have the following properties.

(1) It should be soluble in a water-immiscible solvent and should easily be dispersed in gelatin.

(2) It should be immobile before processing or before releasing of a dye.

(3) It should be stable under storage for a long period of time and under processing conditions at high pH.

(4) It should be oxidized rapidly in the presence of an oxidation product of a developing agent.

(5) Oxidized DRR compound should be cleaved rapidly under alkaline conditions.

Further, the dye which is released from such DRR compound should have additional important properties as mentioned below.

(1) Diffusibility: through gelatin and other binder components between DRR compound containing layer and an image receiving layer.

(2) Necessary color: suitable λ max, half-value width (width of a spectrum at ½ λ max) and inexistence of undesirable absorption.

(3) Chemical stability: stability at higher pH, and stability under reductive conditions during processing and under an oxidative atmosphere over a long period of time after processing.

(4) Solubility at high pH.

(5) To be dyed to mordant at high pH.

(6) Low solubility at low pH.

(7) Stability in color over a wide range of pH in the system.

(8) Not to be desorbed after mordanted.

(9) It should provide a stable color against the changes of the surrounding environment for a long period of time, e.g., the gradual change from wet state to dry state of the image-receiving part after processing.

(10) Light stability.

(11) High extinction coefficient: to afford higher image density by using less amount of DRR compound.

In order to satisfy these requirements, the DRR compound should be selected strictly and specially with respect to the whole and partial molecular structure of the molecule. A DRR compound generally consists, in a functional sense, of a dye portion, a carrier portion which releases a dye by oxidation and hydrolysis and a linkage portion connecting them. Each portion should not inhibit the functions of other portions and the properties provided by the molecular structure as a whole should be preferable.

An object of this invention is to provide novel cyan DRR compounds which possess many superior properties as compared with known DRR compounds and are excellent synthetically.

Another object of this invention is to provide a light-sensitive photographic element which comprises a novel cyan DRR compound associated with at least one light-sensitive silver halide emulsion layer coated on a support.

The DRR compounds according to this invention can be represented by following formula [I] or [II]:

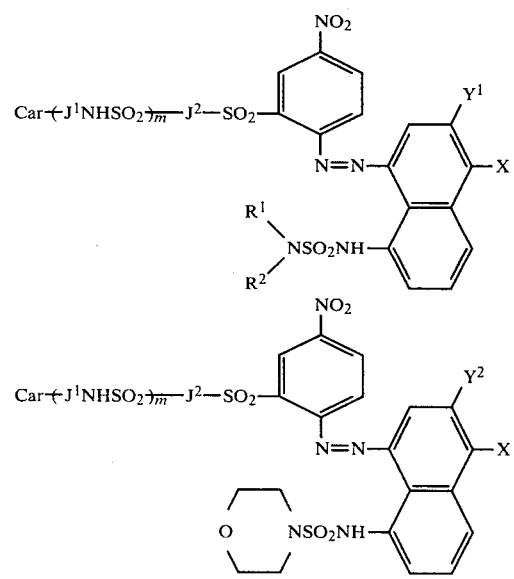

wherein

Car represents a carrier moiety which can be oxidized, preferably by an oxidation product of a silver halide developing agent, under alkaline conditions to release a diffusible dye or precursor thereof from said compound;

$R^1$ and $R^2$, which may be the same or different, independently represent a hydrogen atom or an alkyl group which may be of straight chain or branched having 1 to 3 carbon atoms (provided that the total sum of carbon atoms in $R^1$ and $R^2$ does not exceed 4);

X represents an auxochrome group of a dye portion, i.e., a hydroxyl group or a salt thereof or a group, which can be converted into a hydroxyl group by hydrolysis having the following formulae:

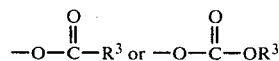

in which $R^3$ represents an alkyl or haloalkyl (having at least one preferably 1 to 3 halogen atoms, such as chlorine bromine or fluorine, in the α-position) group, which may be of straight chain or branched, preferably having 1 to 18 carbon atoms, a phenyl group which may be substituted by at least one preferably 1 to 3 substituents such as chlorine atom, nitro group, etc.;

$Y^1$ represents a

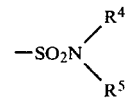

group wherein $R^4$ and $R^5$, which may be the same or different, independently represent a hydrogen atom or an alkyl group, which may be of straight chain or branched having 1 to 4 carbon atoms (provided that the total sum of carbon atoms in $R^4$ and $R^5$ does not exceed 4), preferably one of $R^4$ and $R^5$ is a hydrogen atom and the other is a branched alkyl group having 3 to 4 carbon atoms, more preferably an iso-propyl or tert-butyl group and most preferably a tert-butyl group;

$Y^2$ represents a hydrogen atom or a

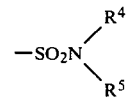

group in which $R^4$ and $R^5$ are the same as defined above;

m represents 0 or 1; and $J^1$ and $J^2$, which may be the same or different, independently represent a bivalent linking group having the general formula $-R^6-(O)_n-R_p^7-$ wherein $R^6$ and $R^7$, which may be the same or different, independently represent an alkylene group, which may be of straight chain or branched having 1 to 8 carbon atoms, or a phenylene group which may be substituted by at least one, preferably 1 to 3 substituents such as a chlorine atom, a methoxy group or a methyl group and when said phenylene group have more than two substituents they may be the same or different;

n represents 0 or 1;

p represents 1 when n is 1 and 1 or 0 when n is 0 (provided that, when p is 1, the total sum of carbon atoms in $R^6$ and $R^7$ does not exceed 13).

In this invention, as a carrier moiety (Car) anyone of those heretofore known in the art can be used, preferred DRR compounds according to this invention have as Car a group represented by following general formula [III], [IV] or [V].

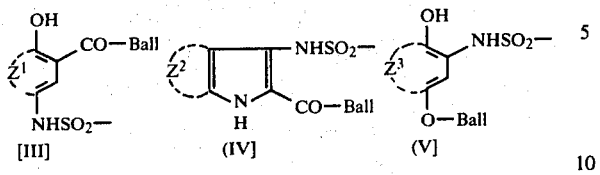

wherein Ball represents an organic ballast group having such number of carbon atoms as to render the DRR compound involved nondiffusibility during processing in an alkaline processing composition; $Z^1$ represents a group of carbon atoms required to complete the benzene, 5,6,7,8-tetrahydronaphthalene, or naphthalene ring; $Z^2$ and $Z^3$ independently represent a group of carbon atoms necessary to complete a benzene ring. The benzene or naphthalene ring may be substituted by one or more and preferably one or two groups. As the substituent, for example, an alkyl group, an alkoxy group, a chlorine atom and a carbamoyl group can be mentioned. Particularly in formula [V], it is preferable for at least one such substituent to be an electron donative group; e.g., an alkyl, alkoxy, alkylthio or arylthio group. Among DRR compounds according to this invention, the compound represented by formula [I] has, in the dye moiety, an aminosulfonylamino group represented by $$-NHSO_2N\begin{array}{c}R^1\\R^2\end{array}$$

at 5-position in relation to X of the naphthalene ring to which an azo group (—N=N—) is attached. $R^1$ and $R^2$ independently represent a hydrogen atom, a methyl group or an ethyl group, more preferably a methyl or ethyl group and most preferably a methyl group. $R^1$ and $R^2$ may be the same or different but the same group is preferable.

In the group $-(J^1-NHSO_2-)_mJ^2SO_2-$ which connects the dye moiety with the carrier moiety, when m is 0, $J^2$ is preferably selected from a bivalent group

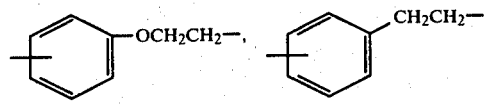

—CH$_2$CH$_2$CH$_2$—, etc. and when m is 1, $J^1$ is preferably

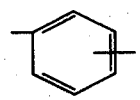

and $J^2$ is preferably selected from a bivalent group

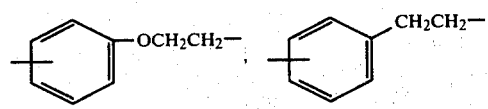

—CH$_2$CH$_2$CH$_2$, etc. and more preferably when m is 0, $J^2$ is

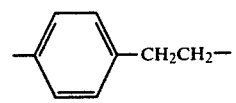

and when m is 1, $J^1$ is

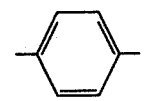

and $J^2$ is

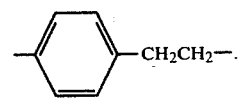

As the Car moiety according to this invention, one represented by the above-mentioned formula [III] or [IV] is more preferable and as the organic ballast group (Ball) may preferably be selected from a group represented by the general formula $$-N\begin{array}{c}R^8\\R^9\end{array}$$

in which $R^8$ and $R^9$ independently represent a hydrogen atom, an alkyl group, cyaloalkyl or ary group, or a combination thereof directly connected each other or through such a bivalent organic group as an ether group, an ester group or a carbamoyl group provided that said alkyl group may be of straight chain or branched. Preferably the total sum of carbon atoms in $R^8$ or $R^9$ does not exceed 34 and the total sum of carbon atoms in $R^8$ and $R^9$ is 12 to 36. More preferably $R^8$ represents a hydrogen atom or an alkyl, preferably of straight chain having 1 to 22 carbon atoms and more preferably a hydrogen atom, methyl group or ethyl group, $R^9$ represents an alkyl group of straight chain having 1 to 34 carbon atoms or alkyl-substituted phenoxyalkyl group e.g., 2,4-di-tert-amylphenoxybutyl.

The Ball group suitable for the Car moiety in the formula [V] is an alkyl group which may be of straight chain or branched or an aromatic hydro carbon group having, preferably 12 to 36 carbon atoms provided that said alkyl group or aromatic hydrocarbon group may have a substituent. Representative examples for Ball are shown below.

—NHC$_{18}$H$_{37}$(n)

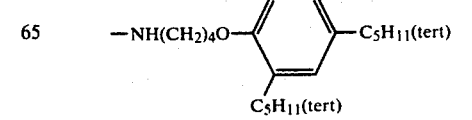

-continued
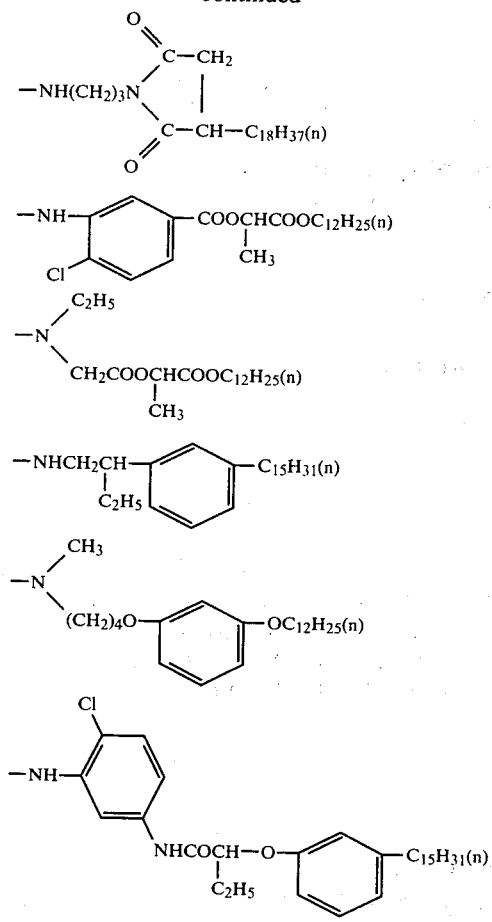
Preferred examples for Car- are illustrated below.
-continued
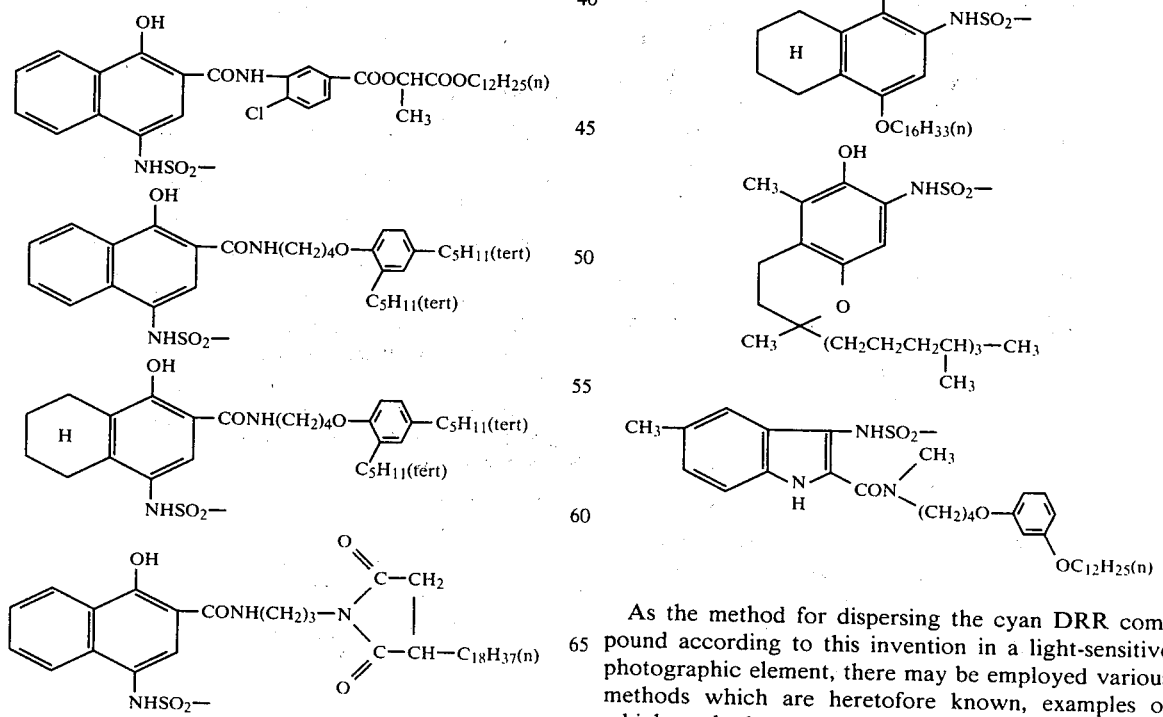
As the method for dispersing the cyan DRR compound according to this invention in a light-sensitive photographic element, there may be employed various methods which are heretofore known, examples of which methods are mentioned below:

(1) A method in which the cyan DRR compound according to this invention is dissolved in a substantially water-insoluble solvent having high boiling point and thereafter disperse it finely in a hydrophilic colloid.

In this method as the particularly useful high boiling point solvent, there may be mentioned N-n-butylacetanilide, N,N-diethyllaurylamide, N,N-dibutyl-laurylamide, dibutyl phthalate, tricresyl phosphate, N-dodecylpyrrolidone, etc.

In order to facilitate the dissolution, a low boiling point solvent or an water-miscible organic solvent may be used.

As the low boiling point solvent may be mentioned, for example, ethyl acetate, methyl acetate, cyclohexanone, acetone, methanol, ethanol and tetrahydrofuran and as the water-miscible organic solvent, for example 2-methoxyethanol or dimethylformamide may be used. These low boiling point solvent and water-miscible organic solvent can be removed by using water or during drying process after coating, and so on.

(2) A method in which the cyan DRR compound according to this invention is incorporated into or onto loadable polymer latex particles by adding said polymer latex and water in such an amount as to sufficiently insolubilize the dissolved cyan DRR compound to a solution of the cyan DRR compound in a water-miscible organic solvent.

Useful water-miscible organic solvents and polymer latices which can be advantageously employed in this invention are described in detail in hereinbefore mentioned LOP Nos. 51-59942/1976 and 51-59943/1976.

(3) A method in which the cyan DRR compound according to this invention is finely pulverized mechanically by using a sand grinder, a colloid mill or the like and thereafter dispersed in a hydrophilic colloid.

(4) A method described in, for example, LOP No. 53-139532/1978, in which the cyan DRR compound according to this invention after being dissolved in a water-miscible organic solvent, is precipitated in said solvent, preferably, in the presence of a surfactant and thereafter the thus formed precipitate is dispersed in a hydrophilic colloid.

(5) A method in which the DRR compound according to this invention, after being dissolved in an alkaline aqueous solution together with a polymer, is precipitated by adjusting the pH value of said solution with an acid and thereafter thus formed precipitate is dispersed in a hydrophilic colloid.

Other various methods may also be applied to obtain a dispersion according to the invention.

As the hydrophilic protective colloid may be used ones similar to those for a silver halide emulsion as mentioned hereinbelow.

The cyan DRR compound used in this invention, which is to be associated with the silver halide emulsion, may be incorporated in the silver halide emulsion layer and/or at least one layer other than the silver emulsion layer, preferably in a layer which is located adjacent to said emulsion layer and on the opposite side of said emulsion layer with respect to the direction from which exposure is performed.

As mentioned above, a diffusible dye or dye precursor can be released imagewise as a function of an oxidation product of a silver halide developing agent under alkaline conditions, by associating the cyan DRR compound according to this invention with a silver halide emulsion layer.

The light-sensitive photographic element according to this invention comprises a support and at least one light-sensitive silver halide emulsion layer coated thereon and having associated therewith the cyan DRR compound according to this invention.

The light-sensitive silver halide emulsion used in this invention is composed of a colloidal dispersion containing, e.g., silver chloride, silver bromide, silver chlorobromide, silver iodobromide, silver chloroiodobromide or a mixture thereof. For the silver halide grains used for the silver halide emulsion, either fine or coarse grains can be used, but ones having an average grain size of around $0.1\mu$ to around $2\mu$ are preferable.

Further, the silver halide emulsion used in this invention can be prepared according to any conventional method, and such well known emulsions as a single jet emulsion, a Lippmann emulsion or an emulsion ripened with thiocyanate or thioether may be employed.

Also either an emulsion comprising silver halide grains having substantial light-sensitivity on the surface of said grains or an emulsion comprising silver halide grains having substantially internal light-sensitivity may be used.

Further, in the present invention, both negative type emulsions and direct positive type emulsions may be used.

As the hydrophilic colloid used for the silver halide emulsion, gelatin may be preferably used, however, other hydrophilic colloids may also be used. These hydrophilic colloids may be used singly or in combination. Further, latex-like polymer dispersion of a hydrophobic monomer such as an alkyl acrylate, may be incorporated in the hydrophilic colloidal layer.

These hydrophilic colloids may be insolubilized with various hardeners without deteriorating the permeability of the processing agent and these hydrophilic colloidal layer may comprise, besides the hardner, a hardening accelerator such as carbonate.

The silver halide emulsion used in this invention may contain conventional chemical sensitizers, a speed increasing compounds such as polyalkylene glycol, cationic surfactant, or thioether, or a combination thereof, antifoggants or stabilizers such as 6-methyl-4-hydroxy-1,3,3a,7-tetrazaindene and sodium 2-mercaptobenzimidazolsulfonate, an optically sensitizers such as cyanine, merocyanine, styryl, hemicyanine (e.g., enamine hemicyanine), oxonol or hemioxonol dyes.

According to this invention when the cyan DRR compound is used in combination with a negative type silver halide emulsion, the dye image obtained in the image receiving layer is a negative image. Therefore, in order to obtain a positive dye image in the image receiving layer various reversal processes are employed.

For example, a method in which a direct positive type silver halide emulsion is used, as described in U.S. Pat. Nos. 3,227,552, 2,592,250, 2,005,837, 3,367,778, 3,761,276, British Pat. No. 1,011,062, Japanese Patent Publication No. 41-17,184/1966 and LOP No. 50-8,524/1975; a method in which a physical development is utilized, as described in British Pat. No. 904,364, LOP No. 47-325/1972 and a method in which a image dye-providing substance is added in a fogged emulsion and a negative type silver halide emulsion layer comprising a compound which releases a development-inhibiting agent upon reaction with the oxidized developing solution is used as an adjacent layer, as described in U.S. Pat. Nos. 3,227,654 and 3,632,345 can be mentioned.

Among various methods used for obtaining a positive dye image a method in which a direct positive type silver halide emulsion is used is preferred. As the direct positive type silver halide emulsion may be mentioned, for example, a silver halide emulsion, the whole surface of which is made to be developable by preliminary exposure or by chemical treatment and which becomes undevelopable imagewise after imagewise exposure thereof to light.

As the other direct positive type silver halide emulsion may be mentioned a direct positive type silver halide emulsion which has mainly internal light-sensitivity. According to a preferred embodiment of this invention a direct positive silver halide emulsion of the latter type, which is described, for instance, in U.S. Pat. No. 2,761,276, may be used. The direct positive silver halide emulsion of this type forms a latent image mainly inside the silver halide grains upon imagewise exposure, and produces a positive silver image upon surface development under fogged conditions.

There are various methods for developing the silver halide emulsion under such fogged conditions. For example, the so-called a developer capable of producing aerial fog described in German Pat. No. 850,383 and U.S. Pat. No. 2,497,875, may be used or the whole surface may be subjected to exposure to flash-light upon development. This latter method is described in German Pat. No. 854,888, U.S. Pat. No. 2,592,298, British Pat. Nos. 1,150,553, 1,195,838 and 1,187,029. Further the development may be conducted in the presence of a fogging agent. As the fogging agent used for this purpose, hydrazine type compounds, N-substituted quarternary ammonium salts and the like may be used either singly or in combination. Among these fogging agents, 1-[4-(2-formylhydrazino)phenyl]-3-phenylthiourea and a combination of $\beta$-acetylphenylhydrazine and t-butylaminoborane may preferably be employed. The amount of the fogging agent thus employed may be varied widely depending upon the purpose, however, in general the use of the agent ranging from 0.1 to 2.0 g. per liter of a processing solution when added to the processing solution and from 0.001 to 0.2 g. per square meter of a coated emulsion when added to the light-sensitive element.

In this invention, the above-mentioned negative silver halide emulsion or various reversal method may be used to obtain optionally a negative or positive dye image on the image receiving layer depending upon the combination with the cyan DRR compound. In order to avoid the decrease of the sensitivity of a light-sensitive silver halide emulsion, it is generally preferable that the cyan DRR compound is incorporated in a layer located on the opposite side of the silver halide emulsion layer with respect to the direction from which exposure is performed. However, when a Leuco type image dye-providing substance, a blue-shift type image dye-forming substance or other image dye-forming substance which does not possess any dye structure at the time of exposure is used they may be incorporated in the silver halide emulsion layer since they do not decrease the sensitivity of the emulsion. Further they may also be incorporated in a layer located in front of the silver emulsion layer with respect to the exposure direction.

In this invention, multi-colored dye image may be obtained by using not less than two combinations of other DRR compounds and silver halide emulsions in addition to the combination of the cyan DRR compound according to this invention and a light-sensitive silver halide emulsion layer. In this case, the range of the wave length over which the silver halide emulsion layer is sensitive and that of absorption by the dye-image, which a diffusible dye or precursor thereof released from the DRR compound associated with the emulsion layer forms on the image-receiving layer may be the same or different. When used for ordinary natural color photography, yellow DRR compound is combined with the blue sensitive emulsion layer, magenta DRR compound with the green sensitive emulsion layer and cyan DRR compound with the red sensitive emulsion layer, although they are employed in different combinations for the purpose of producing a so-called false color image.

In cases where this invention is applied to multi-color photography, an intermediate layer may advantageously be employed in the light-sensitive element. The intermediate layer is able to prevent undesirable interaction between emulsion layer units having different color-sensitivities as well as it controls the diffusibility of an alkaline processing composition. As materials used for the intermediate layer, gelatine, calcium arginate, a copolymer of vinyl acetate and crotonic acid, isopropylcellulose, hydroxypropylmethylcellulose, polyvinylamides, polyvinylamide graft copolymer, or a combination of a latex and a penetrant is advantageously employed.

The intermediate layer may comprise an agent which is capable of inhibiting interactions between emulsion layer units selected depending upon the type of the DRR compounds and the alkaline processing composition to be used. For instance, a reducing agent such as nondiffusible hydroquinone derivatives, e.g., di-t-octylhydroquinone, potassium 2-octadecyl hydroquinone-2-sulfonate; a nondiffusible coupler which can react with the oxidation product of a developing agent to fix the same; an amidrazone compound; hydrazone compound, may be used to prevent the undesirable interaction between emulsion layer units caused by the oxidation product of the developing agents.

Upon coating these above-mentioned layers, it is often advantageous to incorporate a coating aid in the coating composition so that the coating may be effected easily. It is also effective to add a thickner thereto.

As useful coating aids, there may be mentioned, for example, saponin, alkyl ether of sugar, monoalkyl ether of glycerol, ethoxyethylene addition compound of p-nonylphenol, sodium dodecylsulfate, sodium salt of dioctylsulfossuccinate, sodium p-dodecylbenzenesulfonate, betaine group compound described in British Pat. No. 1,159,825 and U.S. Pat. No. 3,441,413 and fluorinated compounds described in Japanese Patent Publication Nos. 49-46,733/1974 and 51-32,322/1976.

As the thickner there may be mentioned, for example, potassium salt of poly-p-sulfostyrene, cellulose sulfate, polyacrylamine, acrylic acid polymer described in U.S. Pat. No. 3,655,407.

For coating the coating composition mentioned above, various methods may be used, for example, slide hopper method and the curtain flow method, dipping method, roller method and air-knife method. Among these methods slide hopper coating which enables multiple coating compositions to be coated simultaneously to form so many layers at a time.

The support for the light-sensitive photographic element of the invention may desirably be a plain and even material which does not cause any dimensional remarkable changes during the treatment with a processing composition. In general a flexible support is advantageously employed, and depending upon the purpose, a hard support such as a glass plate may also be used. As the flexible support anyone which is used for conventional light-sensitive materials, e.g., a cellulose nitrate film, a cellulose acetate film, a polyvinyl acetal film, a polystyrene film, a polyethylene terephthalate film, a polycarbonate film, or a baryta paper may advantageously be empoyed. In this invention, it is advantageous to use a support having vapor permeability in order that the exhalation of the water in the alkaline processing composition through the support is accelerated.

Either transparent or opaque support may be used in this invention depending upon various conditions, such as a manner of constitution of the light-sensitive layer which comprises a light-sensitive silver halide emulsion layer and a DRR compound associated therewith and image-receiving layer, direction from which the element is exposed, manners and places where the processing is conducted (e,g, whether the processing is carrired out in a light or a dark place etc.).

When a light-sensitive element using a transparent support is processed in the light place, in order to prevent the leakage of light, which is so-called a light piping effect, from a direction parallel to the thickness, the transparent support is desirably colored to such an extent as to enable prevention of the permeation of light in the surface direction but not to prevent the exposure and observation.

In cases where an opaque support is used for the purpose of screening light, a pigment such as carbon black, titanium oxide, etc., may be incorporated in the support, or, if necessary, such pigment may be coated on the support with a suitable binder.

The support according to this invention may optionally contain various photographic additives; e.g., a plasticizer such as an ester of phosphoric acid or an ester of phthalic acid, a ultraviolet ray absorber such as 2-(2'-hydroxy-4-t-butylphenyl)benztriazole and an antioxidant such as a hindered phenol. In order to enhance the adhesion between the support and a layer coated thereon, it may be advantageous to have a subbing layer on the support or to apply a suitable surface treatment such as colona discharge treatment, ultraviolet ray irradiation treatment or flame treatment, to the support. The thickness of the support is not critical in this invention, but a support having a thickness of 20 to 300μ may preferably be used.

Upon processing the above-mentioned light-sensitive layer with an alkaline processing composition after imagewise exposure, a diffusible dye or a precursor thereof produced corresponding to the imagewise exposure is diffusion-transferred to an image-receiving layer which is superimposed on the said light-sensitive layer, and then the dye is usually mordanted in said image-receiving layer to form a dye-image. The image-receiving layer may desirably contain a mordant.

As the mordant suitable for the image-receiving layer, any mordant may be used as long as it shows preferable mordanting effect upon the diffusible dye or dye precursor thus transferred. As the useful mordants there can be mentioned, for example, poly(styrene-co-N-vinylbenzyl-N,N,N-trihexylammonium chloride) as described in LOP No. 50-61228/1975, poly(styrene-co-vinylbenzyl chloride-co-N-benzyl-N,N-dimethyl-N-vinylbenzylammonium chloride-co-divinylbenzene), poly-4-vinylpyridine, poly-4-vinyl-N-benzylpyridinum-paratoluenesulfonate, cetyltrimethylammonium bromide as described in LOP No. 51-73,440/1976 and a compound as described in LOP No. 54-1398/1979.

While the above-mentioned mordant is used in various dispersants such as an ordinary gelatin, polyvinyl alcohol, plyvinyl pyrrolidone, completely or partially hydrolyzed cellulose ester and the like, it is also possible for an image-receiving layer to be consisted substantially of a dispersant having a mordanting effect, such as, poly-N-methyl-2-vinylpyridine, N-methoxy-methyl-poly-hexylmethyleneadipamide, a compolymer of vinyl alcohol and N-vinyl pyrrolidone or a polymer mixture thereof, or a partially hydrolyzed polyvinyl acetate, acetylcellulose, gelatin or polyvinyl alcohol. The content of the mordant in the image-receiving layer may preferably range from 10 to 100% by weight.

In a special embodiment, the mordant may be incorporated in the alkaline processing composition.

The image-receiving layer may further be incorporated with various photographic additives which are used in conventional photographic materials, such as a ultraviolet ray absorber, a fluorescent brightening agent, etc.

The above-mentioned image-receiving layer is necessarily in a superimposed position on the light-sensitive layer at the time of processing with an alkaline processing composition, however, before processing they may be situated either separately or in combination. After processing, the light-sensitive layer may remain combined with the image-receiving layer or the former may be peeled apart from the latter.

The image-receiving layer may be coated, as a constituting layer of the light-sensitive photographic element, on the same support upon which the light-sensitive layer is coated, on the same side of said light-sensitive layer or may be coated on a separate support from that for the light-sensitive layer. However, in cases where the light-sensitive layer and the image-receiving layer exist separately before processing or when the light-sensitive layer is peeled off from the image-receiving layer after processing, the image-receiving layer ordinarily is located on a separate support from that for the light-sensitive layer.

As a material for the support for the image-receiving layer similar ones for the light-sensitive photographic element mentioned above can be used.

After the formation of dye image on an image-receiving layer is substantially completed by the application of an alkaline processing composition, it is preferable to lower the pH value within both the light-sensitive layer and image-receiving layers to around 7 in order to increase the stability of the dye image as well as to prevent the discoloration or stain of the image caused at higher pH value by stopping substantially further diffusion of the dye or the precursor thereof. Therefore, it is preferable to locate a neutralizing layer containing a neutralizing agent which lower the pH value within the system.

As the material to be used for the neutralizing agent may be preferred a film-forming polymer acid having at least one carboxyl group, sulfone group or group which forms a carboxyl group by hydrolysis.

As the polymer acid which may be used in this invention, there may preferably be mentioned one having a molecular weight of around 10,000 to around 100,000, e.g., monobutyl ester of a copolymer of maleic anhydride and ethylene (1:1); monobutyl ester of a copolymer of maleic anhydride and methyl vinyl ether (1:1);

monoethyl ester, monopropyl ester, monopentyl ester or monohexyl ester of maleic anhydride and ethylene (1:1); monoethyl ester, monopropyl ester, monopentyl ester or monohexyl ester of maleic anhydride and methyl vinyl ether (1:1); polyacrylic acid, polymethacrylic acid and a copolymer of acrylic acid and methacrylic acid in various ratios; a copolymer of acrylic acid or methacrylic acid with other vinyl monomer in various ratios, i.e., a copolymer with, e.g., acrylic esters, methacrylic esters or vinyl ethers, which contain at least 30 mole %, preferably 50 to 90 mole % of acrylic or methacrylic acid; and so on. Further, metal salts described in Research Disclosure No. 12331, monomer acid, ballasted organic acid, alkyl phosphate, polyacrylphosphate, poly(1-acryloyl-2,2,2-trimethylhydrazinium) p-toluenesulfonate, etc. may also be employed singly or, if necessary, in combination with a binder polymer. Moreover, a combination of a polymer acid and a monomer acid or a polymer acid and an organic amine may also optionally be used. These polymer acids, monomer acids, organic amines and binder polymers may be coated after dissolved in an alcohol such as methanol, ethanol, propanol or butanol; a ketone such as acetone, methylethyl ketone, diethyl ketone, or cyclohexanone; an ester such as methyl acetate, ethyl acetate, isopropyl acetate or butyl acetate; or a mixture thereof. Further, these compounds may also be contained in microcapsules.

The thickness of the neutralizing layer may be varied depending upon the composition of an alkaline processing composition and materials incorporated in the neutralizing layer employed and in general, 5 to 30μ is suitable.

In the present invention, a timing layer (neutralization-rate controlling layer) may be located together with the above-mentioned neutralizing layer to control the decrease of the pH value. The timing layer retards the decrease of the pH value until after desired development and transfer are effected.

Namely, it prevents undesirable decrease of the density of transferred dye image caused by the early decrease of the pH value caused by the neutralizing layer within the system before development of silver halide and formation of diffusion transferred dye image are sufficiently effected.

As the timing layer various materials may be used; for instance, gelatin, polyvinyl alcohol, partial acetal of polyvinyl alcohol, partially hydrolyzed polyvinyl acetate, cyanoethylated polyvinyl alcohol, hydroxypropylmethylcellulose, isopropylcellulose, polyvinylamides, polyvinylamide graft copolymer vinylidene chloride-acrylonitrile-acrylic acid-terpolymer latex or a combination of a latex and a penetrant are useful.

The neutralizing layer and the timing layer may be coated either on the support on which the above-mentioned light-sensitive photographic element is coated, or together with the image-receiving layer, on a support other than that for the light-sensitive element. Further, they may be coated on a support for a processing sheet as mentioned hereinbelow.

In cases where the above-mentioned image-receiving layer is coated on the same support as for the light-sensitive layer before processing, a processing sheet is preferably employed to distribute the alkaline processing composition uniformly and to make it spread smoothly. As the support for the processing sheet the same materials used for the above-mentioned light-sensitive element may optionally be used according to the purpose, and the sheet may be either transparent or opaque depending upon the purpose. On the support for the processing sheet may further be coated a layer containing a mordant as a scavenger, a neutralizing layer or a timing layer.

In cases where the image-receiving layer is combined with the light-sensitive layer before processing and they are peeled apart from each other after processing to obtain an image, a stripping layer may preferably be used. The stripping layer may be coated between the silver halide emulsion layer and the image-receiving layer.

The alkaline processing composition used in this invention is a liquid composition containing processing components necessary for the development of the silver halide emulsion and for the formation of the diffusion-transferred image. The solvent for the alkaline processing liquid is mainly a water, but other hydrophilic solvents such as methanol, methylcellosolve, etc., may also be used additionally. The alkaline processing composition contains an alkaline agent in an amount necessary for the development of the emulsion layer and the formation of the dye image. As the alkaline agent may be used, for example, sodium hydroxide, potassium hydroxide, calcium hydroxide, tetramethylammonium hydroxide, sodium carbonate, sodium phosphate, diethylamine, etc. The alkaline processing composition desirably has a pH value of not less than 12 at room temperature.

The alkaline processing composition may be incorporated with a thickner, i.e., a polymer thickner which is inert to an alkali solution, such as hydroxyethylcellulose, carboxymethylhydroxyethylcellulose, sodium carboxymethylcellulose or hydroxypropylcellulose. The concentration of the thickner is preferably 1 to 10% by weight based upon the alkaline processing composition, whereby the viscosity of the alkaline processing composition is in the range of around 100–300,000 centipoise and the distribution of the composition during processing can be made uniform. Further, the thickner forms a solid (not flowing) film during processing so that the undesirable change of the image can be prevented effectively after the dye image is substantially formed. Moreover, the alkaline processing composition may preferably contain a silver halide developing agent.

As the representative examples for the silver halide developing agent which can be used in the present invention, there may be mentioned, for example, 3-pyrazolidone compounds, e.g., 1-phenyl-3-pyrazolidone, 1-phenyl-4,4-dimethyl-3-pyrazolidone, 1-m-tolyl-3-pyrazolidone, 1-phenyl-4-methyl-3-pyrazolidone, 1-phenyl-4-hydroxymethyl-4-methyl-3-pyrazolidone, 1-phenyl-5-methyl-3-pyrazolidone, 1-p-tolyl-3-pyrazolidone, 1,4-dimethyl-3-pyrazolidone, 1-phenyl-4,4-bis(hydroxymethyl)-3-pyrazolidone, 4-methyl-3-pyrazolidone, 1-(3-chlorophenyl)-4-methyl-3-pyrazolidone, 1-(4-chlorophenyl)-4-methyl-3-pyrazolidone, 1-(3-chlorophenyl)-3-pyrazolidone, 1-(4-chlorophenyl)-3-pyrazolidone, 1-p-tolyl-4-methyl-3-pyrazolidone, 1-o-tolyl-4-methyl-3-pyrazolidone, 1-m-tolyl-4,4-dimethyl-3-pyrazolidone, 5-methyl-3-pyrazolidone, 1-(2-trifluoroethyl)-4,4-dimethyl-3-pyrazolidone, etc.; hydroquinone compounds, e.g., hydroquinone, 2,5-dichlorohydroquinone, 2-chlorohydroquinone, etc.; catechol compounds, e.g., catechol, 3-methoxycatechol, 4-cyclohexylcatechol, etc.; aminophenol compounds, e.g., 4-aminophenol, 3-methyl-4-aminophenol, N-methylaminophenol, 3,5-dibromoaminophenol, etc.; and phenylenediamine compounds, e.g., N,N-diethyl-p-phenylenediamine, N,N-diethyl-3-methyl-p-phenylenediamine, 3-methoxy-N-ethyl-N-ethoxy-p-phenylenediamine, N,N,N',N'-tetramethyl-p-phenylenediamine, etc.

Of the developing agents mentioned above, black-and-white silver halide developing agent; particularly 3-pyrazolidone group developing agent, is preferred in general in order to reduce the stain in the dye image portion to be formed. Further, more than one silver halide developing agent may also be used in combination.

While the above-mentioned silver halide developing agent is generally incorporated in an alkaline processing composition, it may also be incorporated in at least one layer of the light-sensitive photographic element. Further, it may be incorporated in both the alkaline processing composition and the light-sensitive photographic element. In cases where it is incorporated in the light-sensitive photographic element, it may also be incorporated therein in the form of a precursor.

The layers in which said developing agent or precursor thereof is incorporated include for example, a silver halide emulsion layer, a DRR compound-containing layer, an intermediate layer, a protective layer, etc.

In the alkaline processing composition, there may further be incorporated a triazole group compound, e.g., 5-methylbenzotriazole; a benzimidazole group compound, e.g., 5-nitrobenzimidazole; a tetrazaindene group compound, e.g., sulfite of 4-hydroxy-5,6-cyclopenteno-1,3,3a,7-tetrazaindene; potassium bromide; and so on. Further a fogging agent, a silver halide solvent, etc., may also be incorporated depending upon the nature of the silver halide emulsion employed.

The alkaline processing composition used in this invention may preferably be contained in a rupturable container which is prepared, for example, by folding a sheet made of a material having no permeability to air and then sealing each edge so that it may contain said processing composition. It is desirable that the container in which a processing composition is to be filled with is designed so that it may be ruptured at a predetermined position or portion by the inside pressure applied when passed through a pair of pressure applying members and discharge the processing composition.

As the material for forming the above-mentioned container, there may advantageously be employed materials such as laminate of polyethylene terephthalate, polyvinyl alcohol, polyethylene or a laminate of lead foil copolymer of vinyl chloride and polyvinyl acetate. It is desirable that the container is fixed along the front edge of the light-sensitive element and the contained processing liquid composition is spread on the surface of the light-sensitive layer in substantially one direction.

In the present invention, a layer containing a highly white light-reflecting agent may desirably be located as a background of the formed image at the opposite site to the direction of observation. While position of the light-reflecting layer may not be critical, it may desirably be located between the light-sensitive layer and the image receiving layer in cases where the light-sensitive layer is not peeled off from the image receiving layer. The light-reflecting layer may be located preliminarily as a layer, or it may be formed at the time of processing by incorporating a light-reflecting agent in an alkaline processing composition. As the light-reflecting agent may be used titanium dioxide, zinc oxide, barium sulfate, flaked silver, alumina, barium stearate, zirconium oxide, etc., singly or in combination of more than one agent. In cases where the light-reflecting layer is located as a layer in advance, it may be dispersed in an optional hydrophilic colloid through which alkaline solution can permeate, e.g., gelatin, polyvinyl alcohol, etc.

In the above-mentioned light-reflecting layer may further be added stylbene, cumarine, etc., as a brightening agent.

In cases where the silver halide emulsion is processed in the light after exposure, a layer containing opacifying agent may be located in order to protect the silver-halide emulsion from the light. The opacifying layer may be located as a layer in advance or it may be formed at the time of processing. As the opacifying agent may be added, for example, carbon black and indicator dyes. Also certain desensitizing dyes may advantageously be used.

The light-reflecting layer and the opacifying layer may exist as the same layer or may be located as separate layers adjacent to each other.

As the film unit comprising the light-sensitive photographic element according to this invention, various kinds may be used. There may be used, for example, any one of the film units described in U.S. Pat. Nos. 3,415,644, 3,415,645, 3,415,646, 3,473,925, 3,573,042, 3,573,043, 3,594,164, 3,594,165, 3,615,421, 3,576,626, 3,658,524, 3,635,707, 3,672,890, 3,730,718, 3,701,656, and 3,689,262; LOP No. 50-6337/1975 and Belgian Patent Nos. 757,959 and 757,960.

To the film units mentioned above various additives such as a filter dye, etc., which can suitably improve the photographic properties, may also be added to a layer positioned on the side from which incident light comes at the time of exposure, in relation to the silver halide emulsion layer. As the filter dye, there may be used a dye which is stable at an ordinary pH value or is changeable to be colorless upon contact with the alkaline processing composition, by decomposition, etc.

After diffusion transfer of the image dye to the image receiving layer, silver image and dye or dye precursor corresponding to the diffusion transferred image remains in the light-sensitive layer. When the remaining silver and silver halide is removed by treatment with a bleaching bath and a fixing bath or a bleaching-fixing bath and further the dye precursor is converted, if necessary, into a dye, a dye image, which is reversed to the dye image formed on the image receiving layer, can also be obtained.

This invention will be more fully illustrated by way of the following examples, but they are not intended to be limiting the scope of this invention.

EXAMPLE 1

Preparation of Cyan DRR compound 1

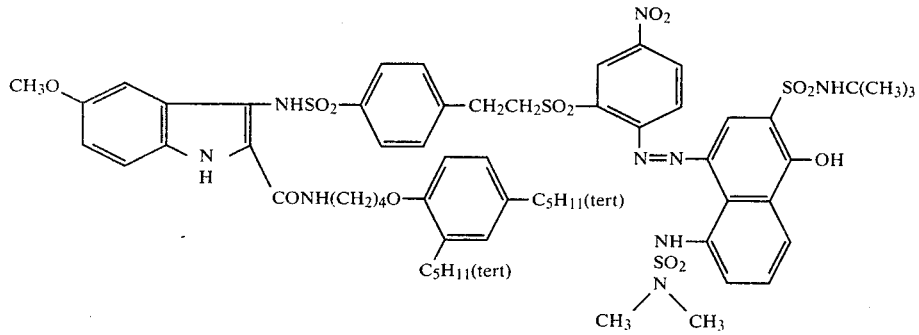

To a solution of 7.8 g. of 3-amino-2-[4-(2,4-di-tert-pentylphenoxy)butylcarbamoyl]-5-methoxy-indole in 150 ml. of tetrahydrofuran were added at 0° C. under a nitrogen stream 14.5 g. of 2-tert-butylsulfamoyl-5-(N,N-dimethylaminosulfonamido)-4-[2{2(4-chlorosulfonyl-phenyl)ethylsulfonyl}-4-nitrophenylazo]-1-naphthol and 12 ml. of pyridine were gradually added dropwise thereto. The resulting mixture was stirred at room temperature for 3 hours and then heated under reflux for further 2 hours. The reaction mixture was cooled to 25° C. and 20 ml. of glacial acetic acid were added thereto. About 50 ml. of tetrahydrofuran were distilled off under reduced pressure and the residue was poured into 1 l. of water. The solid precipitate thus separated was collected on a filter funnel.

Then, the solid was dissolved in 2.5 l. of ethyl acetate, insolubles were filtered off, the filtrate was washed with water and 60 g. of silica gel (Wako gel B-O) were added thereto. After stirring for 2 hours, the mixture was filtered. The so separated silica gel was washed with a mixed solvent of 500 ml. of ethyl acetate and 50 ml. of acetone. The washings and the filtrate were combined and concentrated under reduced pressure to approximate 200 ml. volume, which was then poured into 2 l. of n-hexane. The solid precipitate thus separated was collected on a filter funnel, washed with 1 l. of benzene and then dried. Yield: 16 g. m.p. 218°-221° C.

Preparation of intermediate

C-1:

3-Amino-5-methoxy-2-[4-(2,4-di-tert-pentylphenoxy)-butylcarbamoyl]indole

In 200 ml. of toluene were mixed 21.9 g. (0.1 ml.) of ethyl 5-methoxyindole-2-carboxylate and 30.5 g. of 4-(2,4-di-tert-pentylphenoxy)butylamine and then 50 ml. of the toluene were distilled off. After cooling to 50° C., 36.5 ml. of a 30% sodium methylate solution were added and the resulting mixture was heated under reflux for 5 hours. To the reaction mixture while hot were added dropwise 475 ml. of methanol without additional heating. Then, the reaction mixture was cooled to 0° C. and the precipitate thus formed was collected on a filter funnel and then washed with 200 ml. of methanol. The product was 5-methoxy-2-[4-(2,4-di-tert-pentylphenoxy)butylcarbamoyl]-indole.

In 375 ml. of glacial acetic acid was dissolved the whole product thus obtained while mild heating, the resulting solution was cooled to room temperature and 7.6 g. of sodium nitrite was added portionwise thereto over 1 hour. Stirring was continued for additional 1 hour, the reaction mixture was heated to 40° C. for a short period of time and then cooled to 20° C. Thereafter, the solid precipitate thus separated in the reaction mixture was collected on a filter funnel. The product was washed first with glacial acetic acid and next with a large amount of water. The product was 5-methoxy-3-nitroso-2-[4-(2,4-di-tert-pentylphenoxy)butylcarbamoyl]-indole.

Next, the whole product was added to 400 ml. of methanol with vigorous stirring while passed through a fine sieve. To the resultant slurry was rapidly added on aqueous solution of 41 g. of sodium dithionite (in 165 ml. of water) and the resulting mixture was kept at 60°-65° C. for 2 hours and then cooled to 20° C. The residue was collected on a filter funnel, washed with 600 ml. of a 1% aqueous solution of sodium dithionite and then dried to give 33 g. of the desired product. An over all yield was 67%. m.p. 145°-146° C.

D-1:

2-tert-Butylsulfamoyl-5-(N,N-dimethylaminosulfonamido)-4-[2{2(4-chlorosulfonylphenyl)-ethylsulfonyl}-4-nitrophenylazo]-1-naphthol To a dispersion of 16 g. of 2-tert-butylsulfamoyl-5-(N,N-dimethylaminosulfonamido)-4-[2-(4-sulfophene-thyl)sulfonyl-4-nitrophenylazo]-1-naphthol in 60 ml. of phosphorus oxychloride were added 18 ml. of N-methylpyrrolidone dropwise while kept at below 20° C.

Then, the resulting mixture was stirred at room temperature for 1.5 hours and poured into ice-water. After stirring for 1 hour, the crystalline substance thus separated was collected on a filter funnel, washed well with ice-water, and dried over phosphorus pentaoxide to give 14.8 g. of the desired product. Yield: 91%.

D-2:

2-tert-Butylsulfamoyl-5-(N,N-dimethylaminosulfonamido)-4[2{2(4-sulfophenyl)ethyl}-4-nitrophenylazo]-1-naphthol To 51 g. of conc. sulfuric acid were added 4.10 g. of sodium nitrite while kept at below 25° C., the resulting mixture was heated and kept at 70° C. for 10 minutes and then cooled. Then, 51 g. of glacial acetic acid were added thereto. To the resulting solution were added 21.0 g. of 2-[2-(4-sulfophenyl)-ethylsulfonyl]-4-nitroaniline and stirring was continued at 10°-15° C. for 3 hours. During that period, the suspension was changed into a solution, whereupon the solution was diluted by dropwise addition of 100 ml. of glacial acetic acid and 60 ml. of water and finally about 1 g. of urea was added to decompose excess sodium nitrite, thereby yielding a diazo solution.

On the other hand, 22.0 g. of 2-tert-butylsulfamoyl-5-(N,N-dimethylaminosulfonamido)-1-naphthol were dissolved in a mixture of 220 ml. of ethanol and 20 ml. of glacial acetic acid and then 11 g. of sodium acetate and 50 ml. of water were added thereto for a coupler solution. And, separately, 35 g. of sodium hydroxide were dissolved in 150 ml. of water to form an alkali solution.

Subsequently, the above-mentioned diazo solution and the above-mentioned alkali solution from separate dropping funnels were added dropwise to the above-mentioned coupler solution while cooled to 5°–15° C. The pH during the coupling reaction was 3–4. After completion of the dropwise addition, stirring was continued for 1 hour, the crystalline substance thus separated was collected on a filter funnel, washed with a mixture of methanol-water-conc. hydrochloric acid aqueous solution (50 ml./40 ml./5 ml.) and dried to give 80 g. of the desired product.

D-3: 2-tert-Butylsulfamoyl-5-(N,N-dimethylaminosulfonamido)-1-naphthol

To a mixture of 98 g. of 5-amino-2-tert-butylsulfamoyl-1-naphthol and 800 ml. of pyridine were added dropwise 92 g. of N,N-dimethylaminosulfonyl chloride under ice-cooling and stirring was continued at room temperature for 16 hours. Then, 100 ml. of water were added thereto and stirring was effected for additional 1 hour. Into a mixture of 1040 ml. of an aqueous solution of conc. hydrochloric acid with 4000 ml. of ice-water was poured the reaction mixture thus obtained, thereby separating a solid precipitate. It was then collected on a filter funnel and washed with water.

Then, the product was dissolved in an alkaline aqueous solution of 80 g. of sodium hydroxide in 920 ml. of water, insolubles were filtered off, and the filtrate was poured into a mixture of 330 ml. of an aqueous solution of conc. hydrochloric acid with 2000 ml. of ice-water, whereupon a solid precipitate was separated. It was collected on a filter funnel, thoroughly washed with water and dried. There were obtained 100 g. of the desired product. Yield: 75% m.p. 95°–103° C.

D-4: 2-[2-(4-Sulfophenyl)ethylsulfonyl]-4-nitroaniline

To 80 g. of chlorosulfuric acid were gradually added under ice-cooling 50 g. of 2-phenethylsulfonyl-4-nitroaniline, whereupon hydrogen chloride gas evolved vigorously.

After completion of the addition, stirring was continued at room temperature for 2 hours. Then, the reaction mixture was gradually poured into 1 kg. of ice-water with stirring, whereupon a solid precipitate was separated and excess chlorosulfuric acid was decomposed. The product was collected on a filter funnel and washed with water.

It was then dissolved in 1 l. of chloroform, insolubles were filtered off, the filtrate was concentrated and then refluxed for 4 hours together with 500 ml. of ethanol and 10 ml. of 1 N hydrochloric acid solution. Next, the reaction mixture was concentrated until a solid precipitate began to separate out, 100 ml. of ethyl acetate were then added thereto and thorough stirring was effected. The crystalline substance thus separated was collected on a filter funnel and then dried to give 50 g. of the desired product. Yield: 79% m.p. 248°–253° C.

D-5: 2-Phenethylsulfonyl-4-nitroaniline

To a solution of 77 g. of 2-phenethylthio-4-nitro-aniline in 200 ml. of glacial acetic acid were added under ice-cooling and stirring 1.5 g. of sodium tungstate.2 hydrate and then 55 g. of a 33% aqueous hydrogen peroxide solution were gradually added dropwise thereto.

After completion of the dropwise addition, the mixture was ice-cooled for 2 hours, stirred at room temperature for additional 2 hours and then at 50° C. for further 2 hours to separate a crystalline substance in situ.

After standing at room temperature overnight, the crystalline substance thus separated was collected on a filter funnel, washed with methanol and then dried to give 70 g. of the desired product. Yield: 81% m.p. 141°–192° C.

D-6: 2-Phenethylthio-4-nitroaniline

To a mixture of 500 ml. of ethanol and 2 l. of a 10% aqueous sodium hydroxide solution were added 170 g. of 2-chloro-6-nitrobenzthiazole and the mixture was heated under reflux for 7 hours.

Then, a 5 N hydrochloric acid solution was gradually added dropwise under ice-cooling to the mixture until it became weakly acidic, whereupon a yellow crystalline substance was separated. After standing overnight, the substance thus separated was collected on a filter funnel and washed with water. This product was 2-mercapto-4-nitro-aniline.

The whole product was added to 1.5 l. of ethanol and then 100 ml. of a 40% aqueous solution of sodium hydroxide to produce a red-brown homogeneous solution. A solution of 140 g. of phenethyl bromide, in 200 ml. of ethanol was added dropwise thereto over about 1 hour, stirring was effected at 50° C. for 2 hours and subsequent concentration gave a viscous liquid. To this liquid were added 2 l. of benzene and insolubles were filtered off. To the filtrate were added 100 g. of silica gel (Wako gel B-O) gradually under stirring. The silica gel was filtered off, washed with benzene and the washing and the filtrate were combined and then washed with an about 0.3 N aqueous solution of sodium carbonate and then with water. Subsequent concentration gave a yellow-brown viscous liquid.

After standing overnight, it was solidified. Yield of 77 g. (35.4%) m.p. 68°–72° C.

EXAMPLE 2

Preparation of Cyan DRR compound 2

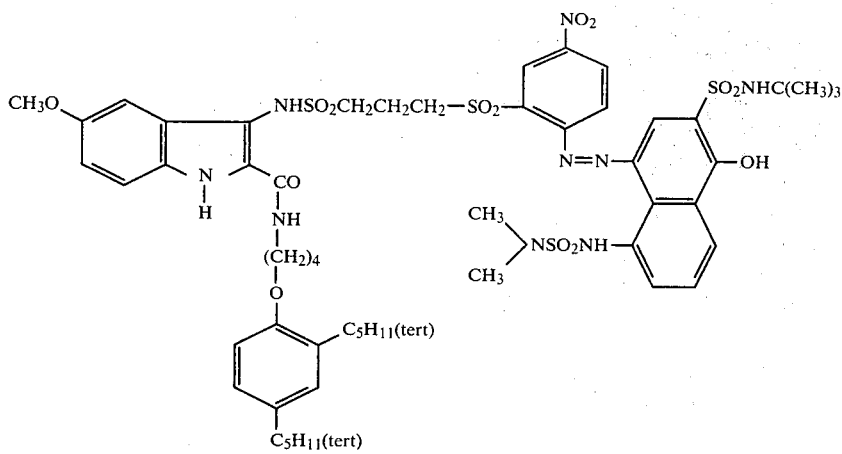

To a solution of 1.83 g. of 3-amino-2-[4-(2,4-di-tert-pentylphenoxy)butylcarbamoyl]-5-methoxyindole in 80 ml. of dry chloroform and 1.9 ml. of pyridine were added under ice-cooling and nitrogen stream 2.3 g. of 2-tert-butylsulfamoyl-5-(N,N-dimethylaminosulfonamido)-4-[2-(3-chlorosulfonylpropylsulfonyl-4-nitrophenylazo)-1-naphthol. The mixture was stirred at room temperature overnight and then boiled under reflux for 2 hours. After cooling, 160 ml. of methanol and 25 ml. of water were added to the mixture and the whole mixture was concentrated under reduced pressure to about ⅓ volume. Thereafter, water was added and the resulting mixture was made acidic with hydrochloric acid to separate a precipitate. The precipitate was filtered, dried and then purified by a benzene-silica gel chromatography to produce 1.9 g. of the desired product. m.p. 212°–218° C. (modified at 172°–177° C.)

Preparation of intermediate 2-tert-Butylsulfamoyl-5-(N,N-dimethylaminosulfonamido)-4-[2-(3-chlorosulfonylpropyl)sulfonyl-4-nitrophenylazo]-1-naphthol (yield, 77%) and 2-tert-butylsulfamoyl-5-(N,N-dimethylaminosulfonamido)-4-[2-(3-sulfopropyl)sulfonyl-4-nitrophenylazo]-1-naphthol (yield, 96%) were synthesized in the same manner as in the preparation of the intermediate for Cyan DRR compound 1.

D-7: 2(3-Sulfopropyl)sulfonyl-4-nitroaniline sodium salt

In 30 ml. of acetic acid containing 10% formic acid were dissolved 2 g. of 2(3-sulfopropyl)thio-4-nitroaniline sodium salt and then 0.1 g. of sodium tangstate.2 hydrate were added thereto under stirring and ice-cooling. To the mixture were added dropwise 1.5 g. of 35% hydrogen peroxide gradually. Then, stirring was continued at room temperature for 4 hours and the reaction mixture was poured into 200 ml. of ethyl acetate to separate a precipitate in situ. The crystalline precipitate thus separated was recovered by filtration and then dried to give 1.9 g. of the desired product. m.p. 161°–164° C.

D-8: 2(3-Sulfopropyl)thio-4-nitroaniline sodium salt

In a mixture of 50 ml. of ethanol and 0.46 g. of metallic sodium were dissolved 3.4 g. of 2-mercapto-4-nitroaniline and 2.44 g. of propanesultone were added thereto under stirring. Thereafter, heating was conducted at 40°–50° C. for 1 hour and the crystalline substance thus separated was recovered by filtration, washed with ethanol and acetone and then dried to give 2 g. of the desired product. m.p. 181°–193° C.

EXAMPLE 3

Preparation of Cyan DRR compound 10

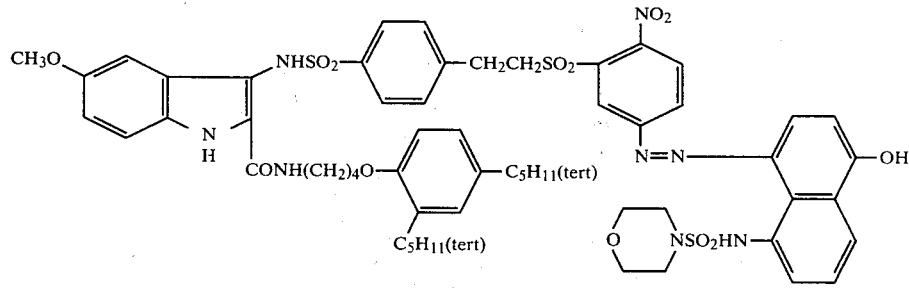

To a solution of 0.79 g. of 3-amino-2-[4-(2,4-di-tert-pentylphenoxy)butylcarbamoyl]5-methoxyindole in 20 ml. of acetone were added under ice-cooling and nitrogen stream 1.3 g. of pyridine and a solution of 1.3 g. of 4[2{2(4-chlorosulfonylphenyl)ethylsulfonyl)}-4-nitrophenylazo]-5-morpholinosulfonamido-1-naphthol in 30 ml. of acetone was added dropwise thereto. Reaction was effected by stirring under cooling with ice-water for 30 minutes and at room temperature for 3 hours. The resulting reaction mixture was added to a mixture of 200 ml. of water and 5 ml. of conc. hydrochloric acid. The precipitate thus separated was filtered, washed with water and dried. The crude product was chromatographed over a silica gel column and elution was done with ethyl acetate. Eluates were concentrated, the residual solid substance was subjected to a silica gel thin layer chromatography, which was developed with benzene: acetone (1:1). The cyan component was extracted with acetone, the extract was concentrated, the residue was dissolved in ethyl acetate and the resulting solution was diluted with n-hexane. The precipitate was recovered by filtration and then dried to afford 0.2 g. of the desired product. m.p. 190°–200° C.

Preparation of intermediate

D-9:
4[2{2(4-Chlorosulfonylphenyl)ethylsulfonyl}-4-nitrophenylazo]-5-morpholinosulfonamido-1-1-naphthol To 40 ml. of phosphorus oxychloride were added 3.8 g. of 4[2{2(4-sulfophenyl)ethylsulfonyl)}4-nitrophenylazo]-5-morpholinosulfonamido-1-naphthol sodium salt and then 8 ml. of N-methylpyrrolidone were added dropwise under stirring and ice-cooling. The mixture was allowed to stand at room temperature for 1 hour and then stirring was continued for further 1 hour. The resulting solution was added to 250 g. of ice, the solid substance thus separated was recovered by filtration, washed with water and then dried to give 1.3 g. of the desired product.

D-10:
4[2{2(4-Sulfophenyl)ethylsulfonyl}4-nitrophenylazo]5-morpholinosulfonamido-1-naphthol salt To 3 ml. of conc. sulfuric acid under cooling was added 0.43 g. of sodium nitrite, dissolved by heating and, after cooling, 5.5 ml. of acetic acid were added thereto. The resulting solution was cooled to 5° C. and 2.32 g. of 2[2(4-sulfophenyl)ethylsulfonyl]-4-nitroaniline were added thereto with stirring. Stirring was continued at room temperature for 3 hours to prepare a diazonium salt solution. Separately, a solution of 1.85 g. of 5-morpholinosulfonamido-1-naphthol in 250 ml. of ethanol and 30 ml. of water was prepared, and a solution of 15 g. of sodium acetate in 40 ml. of water was added thereto with stirring. To the resulting solution, the diazonium salt solution as prepared above was added dropwise under ice-cooling. The reaction mixture was stirred at about 50° C. for 2 hours. Thereafter, the mixture was concentrated to about 100 ml., the precipitate thus separated was recovered by filtration and dried to give 4.3 g. of the desired product.

D-11: 5-Morpholinosulfonamido-1-naphthol

To a solution of 4.8 g. of 5-amino-1-naphthol in 210 ml. of acetonitrile were added 2.5 ml. of pyridine and a mixture of 75 ml. of acetonitrile and 5.6 g. of morpholinosulfonyl chloride was added dropwise thereto under stirring and ice-cooling. Stirring was continued at room temperature for 2 hours and reaction was conducted at 40° C. for 1 hour. The mixture was concentrated and the residue was added to about 150 ml. of water containing 3 ml. of conc. hydrochloric acid. The precipitate thus separated was recovered by filtration, washed with water and then dried to give 6.7 g. of the desired product with m.p. 220°–223° C. (with dec.).

EXAMPLE 4

Spectra and light stability of a dyed film strip comprising a mixture of gelatin and latex mordant (1/1 by weight), said mixture being coated upon a clear polyester support coated amount of each component was 2.5 g/m² respectively. The latex mordant as used herein was poly(styrene-co-vinylbenzyl chloride-co-N-benzyl-N,N-dimethyl-N-vinylbenzylammonium chloride-codivinylbenzene) (molar ratio of 4.90:0.49:4.41:0.2) as disclosed in LOP No. 51-73440/1976.

The dyeing was effected as follows:

The dye was first dissolved in a 0.86 N aqueous solution of potassium hydroxide.

An undyed film strip was dipped into the dye solution and dipping was continued until a transmission density reached about 1.0.

Then, this strip was washed with water, equilibrated over about 1 minute by dipping it into an aqueous standard buffer solution having the indicated pH values and then dried.

A. Spectrophotometry

In the case of the dye colored on the mordant on a transparent support, absorption spectrum of the dye was measured by a transmission method using a spectrophotometer. Its maximum wave length ($\lambda$ max) and respective absorption band width ($\frac{1}{2}$ Bw) at a half density of $\lambda$ max are also shown in Table 3. The band width as well as $\lambda$ max can represent chromaticity. The more lightness and purity of color is increased, the less these values become. Further, in order to show degrees of shoulders in shorter wave length than $\lambda$ max and auxiliary absorption, a ratio of absorbance in shorter wave length to absorbance in $\lambda$ mas is also shown. The less such a value is, the more pure chromaticity is given, which becomes advantageous in color reproduction of a multicolor photograph.

B. Dependance of absorption spectrum on pH value

As seen in the light-sensitive photographic element mentioned below, the dye is placed under alkaline condition when treated and under acidic condition of around pH 4 as the time lapses. Therefore, stable chromaticity should be ideally shown over a wide range of pH value. The Table 3 also shows the pH range that can keep a favourable stable chromaticity when each dye is dyed on the mordant.

C. Light stability

A dyed film strip was subjected to light irradiation and its light stability was measured by the following procedures.

A dyed film strip piece having a transmission density of about 1.0–1.5 was irradiated by a 6000 W xenon arc lamp for 24 hours. Irradiation strength on the strip surface was 60,000 lx.

The optical density at $\lambda$ max before exposure (Do) and after exposure (D) was measured and the residual rate (%) was expressed in terms of a value from D/Do × 100. The results are shown in Table 3.

D. Image-forming rate of DRR compound

The layered monochromatic liquid-sensitive photographic element was prepared and treated as prescribed.

After treatment with a processing composition, a dye image was observed through a transparent support of the light-sensitive photographic element and reflection density of the dye image was continuously measured through a red filter ($\lambda$ max=644 nm) using SAKURA photoelectric densitometer, type PDA-60.

In Table 4 are shown the time to reach 50% density (t 0.5) and 80% density (t 0.8) of the maximum density (D max) at the time of 15 minutes after processing with the processing composition. The time expresses image-forming rate processing was done at 25° C.

Preparation of layered monochromatic light-sensitive photographic element:

A transparent polyethylene terephthalate film support with a thickness of 150 μm was coated successively with the following layers to make up a layered monochromatic light-sensitive photographic element.

(1) Image receiving layer having a dry film thickness of 2.5–3.0 μm containing each 2.5 g/m² of gelatin and poly(styrene-co-vinylbenzylchloride-co-N-benzyl-N,N-dimethyl-N-vinylbenzylammonium chloride-co-divinylbenzene) (molar ratio of 4.90:0.49:4.41:0.2).

(2) Light reflecting layer having a dry film thickness of 7–8 μm containing titanium dioxide (22 g/m²) and gelatin (2.2 g/m²).

(3) Opacifying layer with a dry film thickness of 4 μm containing carbon black (2.8 g/m²) and gelatin (1.8 g/m²).

(4) Cyan DRR component containing layer having a dry film thickness of 2.2 μm containing cyan DRR compound (1 mmol/m²), N,N-diethyllaurylamide (1.1 g/m²) and gelatin (2.5 g/m²).

(5) Red sensitive silver halide emulsion layer having a dry film thickness of 1.5 μm containing red sensitive internal latent image direct positive silver bromide emulsion (1.4 g/m² calculated in terms of silver), potassium 2-octadecylhydroquinone-5-sulfonate (0.1 g/m²), formyl-4-methylphenylhydrazide (13 mg/m²) and gelatin (1.65 g/m²).

(6) Protective layer having a dry film thickness of about 0.7 μm containing mucochloric acid (100 mg/m²) and gelatin (1 g/m²).

Dispersion of DRR compound was prepared as mentioned below.

To a solution of 1 g. of DRR compound in 3 ml. of ethyl acetate was added N,N-diethyllaurylamide and the resulting solution was emulsified and dispersed in 25 ml. of a 10% aqueous gelatin solution containing 0.24 g. of "Alkanol XC" (available from E. I. Du Pont).

In cases where DRR compound is sparingly soluble in ethyl acetate, cyclohexanone was used.

Next, a processing sheet was prepared by successive coating of the following layers onto a transparent polyethylene terephthalate film support having a thickness of 100 μm.

(1) Neutralizing layer having a dry film thickness of 22.0 μm containing a copolymer of acrylic acid and butyl acrylate (75/25% by weight) (22 g/m²).

(2) Timing layer (the lower layer of the two-layer construction) having a dry film thickness of 5.0 μm containing cellulose diacetate (acetyl number 40%) (5 g/m²).

(3) Timing layer (the upper layer of the two-layer construction) having a dry film thickness of 1 μm, containing poly(vinylidene chloride-co-acrylonitrile-co-acrylic acid) (79/15/6% by weight) (1.1 g/m²).

The resulting layered monochromic light-sensitive photographic element was subjected to the prescribed exposure through an optical wedge which has 30 density steps with the density, difference between each two steps being 0.15. Then, the above-mentioned processing sheet was put thereupon and a pod containing about 1.0 ml. of a processing composition having the following formulation, were adhered between them to form a film unit. Then, the film unit was passed through a pair of rollers paralleled under pressure and having a clearance of about 340 μm to break the pod and develop its content between the said light-sensitive photographic element and the processing sheet.

The formulation of the processing composition as used herein was as follows:

| | |
|---|---|
| Potassium hydroxide | 56 g. |
| Sodium sulfite | 2.0 g. |
| 4-Hydroxymethyl-4-methyl-1-phenyl-3-pyrazolidone | 8.0 g. |
| 5-Methylbenzotriazole | 2.8 g. |
| Carbon black ("Raven-450" available from Columbian Carbon) | 150 g. |
| Carboxymethyl cellulose sodium salt (of a high viscosity, available from Tokyo Kasei K. K.) | 50.0 g. |
| Benzyl alcohol | 1.5 ml. |
| Distilled water made up to | 1000.0 ml. |

Dye image was observed through the transparent of the light-sensitive photographic element after several minutes.

Table 1 shows examples of the present DRR compounds and Table 2 does dyes released from the given DRR compounds.

TABLE 1

| No. of DRR compound | Formula | Car | m | J¹ | J² | Y¹ or Y² | R¹ | R² | X |
|---|---|---|---|---|---|---|---|---|---|
| 1 | I | a | 0 | | —⟨phenyl⟩—CH₂CH₂— | —SO₂NHC(CH₃)₃ | CH₃ | CH₃ | OH |
| 2 | I | a | 0 | | —CH₂CH₂CH₂— | —SO₂NHC(CH₃)₃ | CH₃ | CH₃ | OH |
| 3 | I | a | 1 | —⟨phenyl⟩— | —⟨phenyl⟩—CH₂CH₂— | —SO₂NHC(CH₃)₃ | CH₃ | CH₃ | OH |
| 4 | I | b | 0 | | —⟨phenyl⟩—CH₂CH₂— | —SO₂NHC(CH₃)₃ | CH₃ | CH₃ | OH |
| 5 | I | a | 0 | | —⟨phenyl⟩—CH₂CH₂— | —SO₂NHC₃H₇(iso) | CH₃ | CH₃ | OH |
| 6 | I | a | 0 | | —⟨phenyl⟩—CH₂CH₂— | —SO₂N(C₃H₇(iso))₂ | CH₃ | CH₃ | OH |
| 7 | I | a | 0 | | —⟨phenyl⟩—CH₂CH₂— | —SO₂NHCH₃ | CH₃ | CH₃ | OH |

TABLE 1-continued
| No. of DRR compound | Formula | Car | m | J¹ | J² | Y¹ or Y² | R¹ | R² | X |
|---|---|---|---|---|---|---|---|---|---|
| 8 | I | a | 0 | | —⟨⟩—CH₂CH₂— | —SO₂NH₂ | CH₃ | CH₃ | OH |
| 9 | I | a | 0 | | —⟨⟩—CH₂CH₂— | —SO₂NHC(CH₃)₃ | C₂H₅ | C₂H₅ | OH |
| 10 | I | a | 0 | | —⟨⟩—CH₂CH₂— | —SO₂NHC(CH₃)₃ | H | H | OH |
| 11 | I | a | 0 | | —⟨⟩—CH₂CH₂— | H | | | OH |
| 12 | I | a | 0 | | —⟨⟩—CH₂CH₂— | —SO₂NHC(CH₃)₃ | | | OH |
| 13 | I | b | 0 | | —⟨⟩—CH₂CH₂— | H | | | OH |
| 14 | I | b | 1 | —⟨⟩— | —⟨⟩—CH₂CH₂ | H | | | OH |
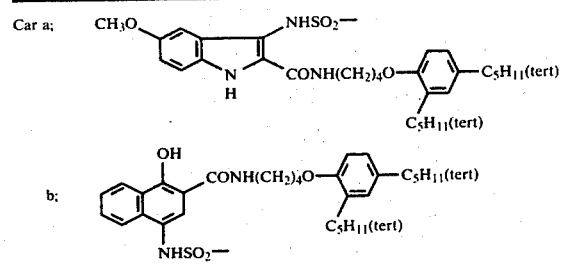
Car a;
b:
The well-known DRR compounds used in comparative tests.
No. of DRR compound
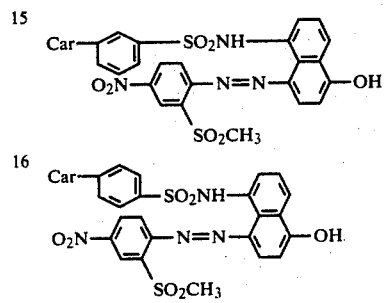
15  Car=a
16  Car=b
17  Car=a
18  Car=a
19  Car=a

TABLE 2

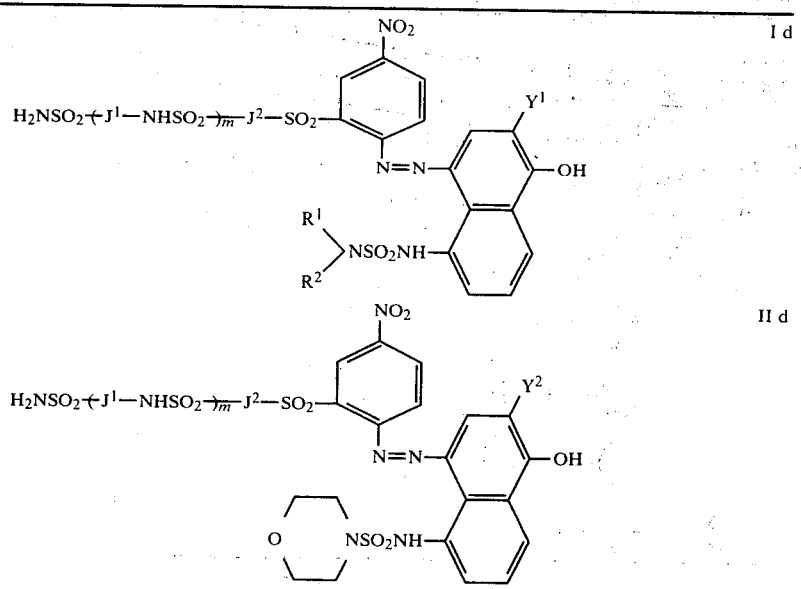

| No. of released dye | Formula | m | J¹ | J² | Y¹ or Y² | R¹ | R² |
|---|---|---|---|---|---|---|---|
| 1 | I d | 0 | | -C₆H₄-CH₂CH₂- | $-SO_2NHC(CH_3)_3$ | $CH_3$ | $CH_3$ |
| 2 | I d | 0 | | $-CH_2CH_2CH_2-$ | $-SO_2NHC(CH_3)_3$ | $CH_3$ | $CH_3$ |
| 3 | I d | 1 | -C₆H₄- | -C₆H₄-CH₂CH₂- | $-SO_2NHC(CH_3)_3$ | $CH_3$ | $CH_3$ |
| 4 | I d | 0 | | -C₆H₄-CH₂CH₂- | $-SO_2NHC_3H_7(iso)$ | $CH_3$ | $CH_3$ |
| 5 | I d | 0 | | -C₆H₄-CH₂CH₂- | $-SO_2N(C_3H_7(iso))_2$ | $CH_3$ | $CH_3$ |
| 6 | I d | 0 | | -C₆H₄-CH₂CH₂- | $-SO_2NHCH_3$ | $CH_3$ | $CH_3$ |
| 7 | I d | 0 | | -C₆H₄-CH₂CH₂- | $-SO_2NH_2$ | $CH_3$ | $CH_3$ |
| 8 | I d | 0 | | -C₆H₄-CH₂CH₂- | $-SO_2NHC(CH_3)_3$ | $C_2H_5$ | $C_2H_5$ |
| 9 | I d | 0 | | -C₆H₄-CH₂CH₂- | $-SO_2NHC(CH_3)_3$ | H | H |
| 10 | II d | 0 | | -C₆H₄-CH₂CH₂- | H | — | — |
| 11 | II d | 0 | | -C₆H₄-CH₂CH₂- | $-SO_2NHC(CH_3)_3$ | — | — |

TABLE 2-continued
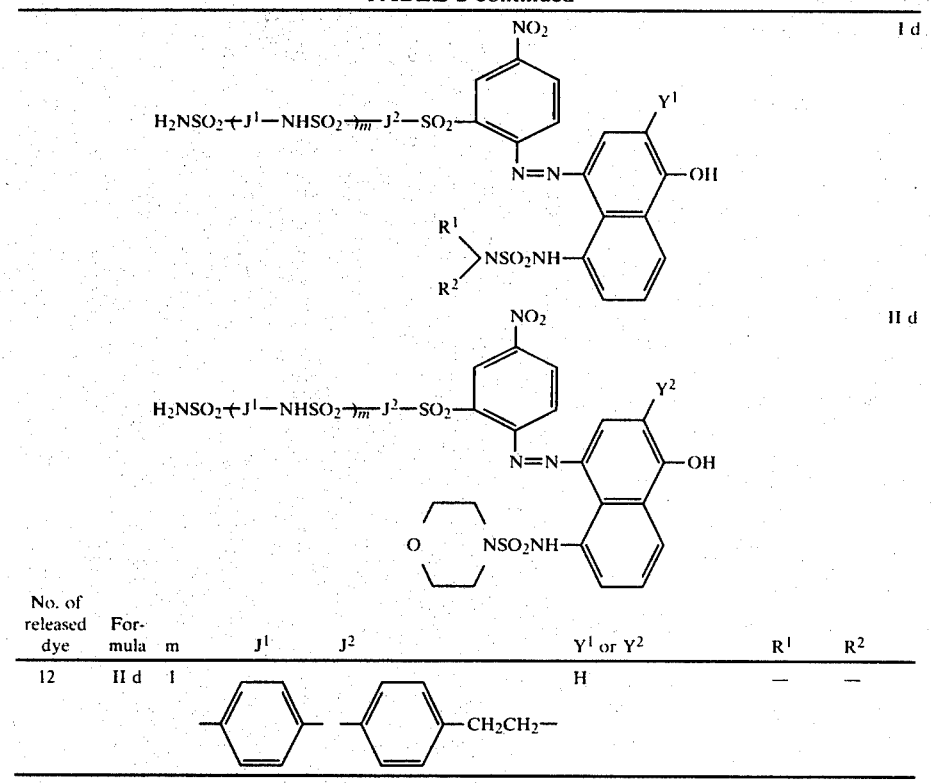
| No. of released dye | Formula | m | $J^1$ | $J^2$ | $Y^1$ or $Y^2$ | $R^1$ | $R^2$ |
|---|---|---|---|---|---|---|---|
| 12 | II d | 1 | -C₆H₄- | -C₆H₄-CH₂CH₂- | H | — | — |
The well-known released dyes used in comparative tests.
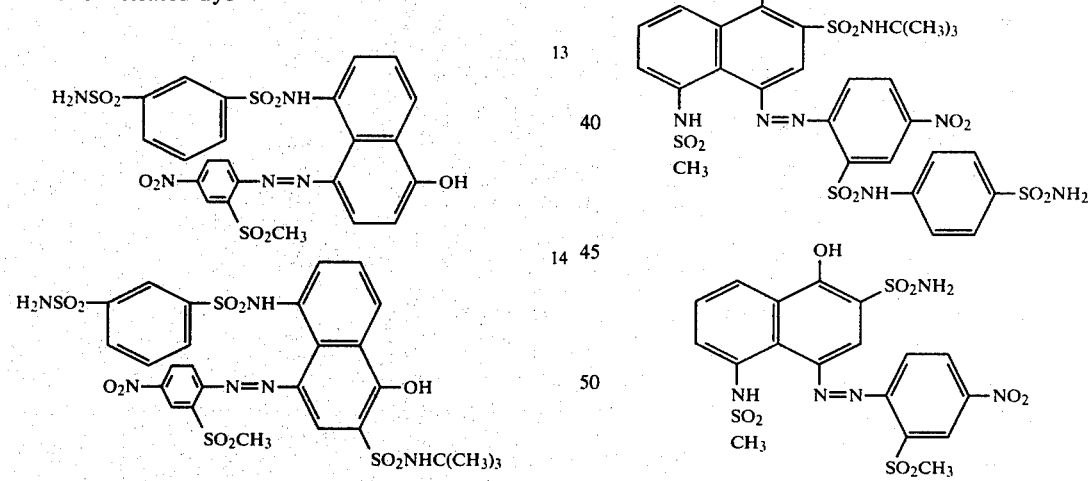
TABLE 3
| No. of released dye | pH | λ max nm | ε 580/ε 645 | ε 550/ε 645 | ε 450/ε 645 | ½ Bw nm | pH range for favourable spectrum | Lightly stability D/Do × 100% |
|---|---|---|---|---|---|---|---|---|
| 1 | 4 | 656 | 0.42 | 0.19 | 0.08 | 100 | 2–12 | 90 |
| 2 | 4 | 656 | 0.42 | 0.18 | 0.09 | 101 | 2–12 | 85 |
| 3 | 4 | 654 | 0.42 | 0.18 | 0.08 | 98 | 2–12 | 90 |
| 4 | 4 | 654 | 0.44 | 0.19 | 0.09 | 101 | 2–12 | 85 |
| 5 | 4 | 655 | 0.43 | 0.21 | 0.09 | 100 | 2–12 | 83 |
| 6 | 4 | 655 | 0.43 | 0.20 | 0.09 | 108 | 2–12 | 85 |
| 7 | 4 | 652 | 0.43 | 0.20 | 0.08 | 100 | 2–12 | 80 |
| 8 | 4 | 652 | 0.43 | 0.21 | 0.09 | 100 | 2–12 | 88 |
| 9 | 4 | 658 | 0.43 | 0.21 | 0.09 | 105 | 2–12 | 88 |
| 10 | 4 | 646 | 0.40 | 0.15 | 0.08 | 90 | 3–12 | 90 |

TABLE 3-continued

| No. of released dye | pH | λ max nm | ε 580/ε 645 | ε 550/ε 645 | ε 450/ε 645 | ½ Bw nm | pH range for favourable spectrum | Lightly stability D/Do × 100% |
|---|---|---|---|---|---|---|---|---|
| 11 | 4 | 655 | 0.44 | 0.20 | 0.09 | 103 | 2–12 | 92 |
| 12 | 4 | 653 | 0.43 | 0.20 | 0.08 | 103 | 2–12 | 93 |
| 13 | 4 | 644 | 0.43 | 0.16 | 0.08 | 93 | 2–10 | 40 |
| 14 | 4 | 660 | 0.51 | 0.23 | 0.08 | 140 | 2–12 | 75 |
| 15 | 5 | 660 | 0.42 | 0.18 | 0.07 | 108 | 4–7 | 78 |
| 16 | 4 | 660 | 0.54 | 0.23 | 0.08 | 124 | 2–12 | 77 |

As can be seen from the above results, the well-known released dyes of No. 13 through No. 16 may show some satisfactory performances, but are not satisfactory in all performances. More specifically, the dye No. 13 shows an excellent absorption spectrum but a poor light stability; the dyes No. 14 and No. 16 have a good light stability, but a poor broad absorption spectrum and the dye No. 15 is generally good in absorption spectrum and light stability, but not satisfactory because it can show good absorption spectrum only within a narrow pH range.

As compared with these well-known dyes, the present dyes are satisfactory in all performances and provide improvement in the prior art.

TABLE 4

| No. of DRR compound | D max | t 0.5 | t 0.8 |
|---|---|---|---|
| 1 | 2.52 | 1 min. 10 sec. | 2 min. 02 sec. |
| 2 | 2.51 | 1 min. 05 sec. | 2 min. 00 sec. |
| 3 | 2.48 | 1 min. 08 sec. | 2 min. 10 sec. |
| 4 | 2.54 | 1 min. 12 sec. | 2 min. 18 sec. |
| 5 | 2.48 | 1 min. 20 sec. | 2 min. 12 sec. |
| 6 | 2.55 | 1 min. 26 sec. | 2 min. 30 sec. |
| 7 | 2.50 | 1 min. 18 sec. | 2 min. 28 sec. |
| 8 | 2.45 | 1 min. 32 sec. | 2 min. 40 sec. |
| 9 | 2.42 | 1 min. 38 sec. | 2 min. 42 sec. |
| 10 | 2.43 | 1 min. 36 sec. | 2 min. 39 sec. |
| 11 | 2.60 | 1 min. 00 sec. | 1 min. 55 sec. |
| 12 | 2.57 | 1 min. 15 sec. | 2 min. 23 sec. |
| 13 | 2.58 | 1 min. 05 sec. | 2 min. 02 sec. |
| 14 | 2.51 | 1 min. 12 sec. | 2 min. 18 sec. |
| 15 | 2.45 | 1 min. 40 sec. | 2 min. 55 sec. |
| 16 | 2.46 | 1 min. 45 sec. | 3 min. 00 sec. |
| 17 | 2.50 | 1 min. 52 sec. | 3 min. 10 sec. |
| 18 | 2.49 | 1 min. 55 sec. | 3 min. 30 sec. |
| 19 | 2.51 | 2 min. 10 sec. | 3 min. 41 sec. |

As apparent from the results in Table 4, the present DRR compounds No. 1 through No. 14 are superior even in transfer rate to the well-known DRR compounds No. 15 through No. 19.

We claim:

1. A light-sensitive photographic element comprising a support and at least one light-sensitive silver halide emulsion layer coated thereon and having associated therewith a cyan image dye-providing compound represented by formula [I] or [II]:

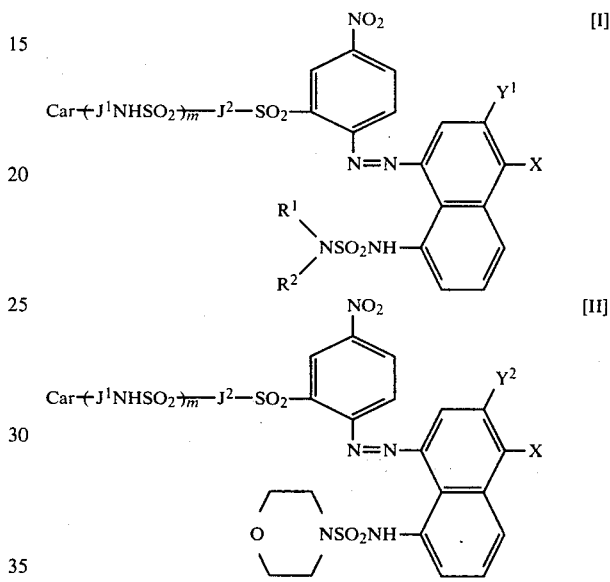

wherein

Car represents a carrier moiety having an organic ballast group containing sufficient carbon atoms to render the compound nondiffusible during processing in an alkaline processing composition, which can be oxidized under alkaline conditions to release a diffusible dye or a precursor thereof from said compound;

$R^1$ and $R^2$, which may be the same or different, independently represent a hydrogen atom or an alkyl group having 1 to 3 carbon atoms (provided that the total sum of carbon atoms in $R^1$ and $R^2$ does not exceed 4);

X represents a hydroxyl group or a salt thereof or a group which can be converted into a hydroxyl group by hydrolysis and having the following formulae:

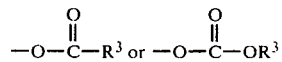

in which $R^3$ represents an alkyl or haloalkyl group having 1 to 18 carbon atoms or a phenyl group which may be substituted;

$Y^1$ represents

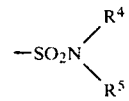

group in which R⁴ and R⁵ may be the same or different and independently represent a hydrogen atom or an alkyl group having 1 to 4 carbon atoms (provided that the total sum of carbon atoms in R⁴ and R⁵ does not exceed 6);

Y² represents a hydrogen atom or a group

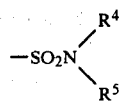

in which R⁴ and R⁵ are the same as defined above;

m represents 0 or 1; and

J¹ and J² may be the same or different and independently bivalent linking group having the formula —R⁶— —(O)ₙ—Rₚ⁷— in which R⁶ and R⁷, which may be the same or different, independently represent an alkylene group having 1 to 8 carbon atoms or a phenylene group which may be substituted;

n represents 0 or 1;

p represents 1 when n is 1 and 1 or 0 when n is 0 (provided that, when p is 1, the total sum of carbon atoms in R⁶ and R⁷ does not exceed 13).

2. A light-sensitive photographic element according to claim 1 wherein said Car represents a group having following formula [III]:

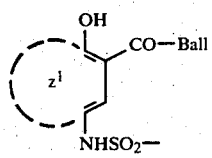

wherein Ball represents an organic ballast group having sufficient carbon atoms to render the compound nondiffusible during processing in an alkaline processing composition and z¹ represents a group of carbon atoms necessary for completing a benzene ring, 5,6,7,8-tetrahydrophthalene or a naphthalene ring.

3. A light-sensitive photographic element according to claim 2 wherein said Car represents a group having the following formula:

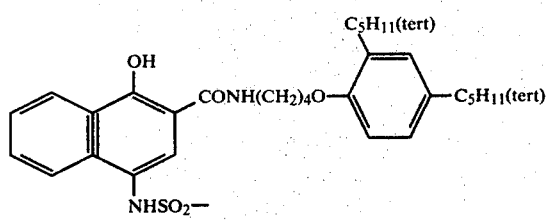

4. A light-sensitive photographic element according to claim 3 wherein R¹ and R² in formula [I] independently represent a methyl group or an ethyl group.

5. A light-sensitive photographic element according to claim 4 wherein, in formula [I], m equals 0 and J² represents a bivalent group selected from

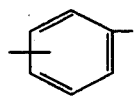 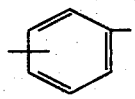

—CH₂CH₂CH₂—.

6. A light-sensitive photographic element according to claim 5 wherein R¹ and R² in formula [I] are the same and each is a methyl group or an ethyl group.

7. A light-sensitive photographic element according to claim 6 wherein said cyan image dye-providing compound is represented by the following formula:

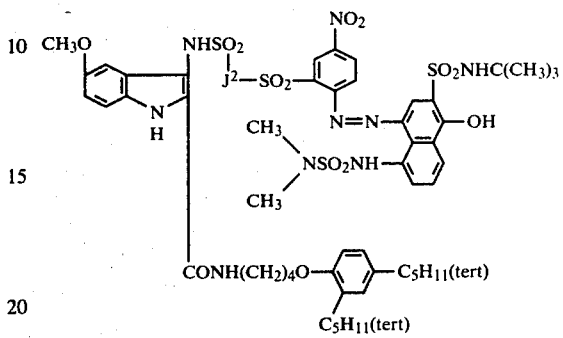

wherein J² represents a bivalent group selected from

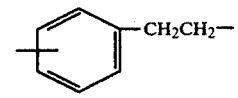

and —CH₂CH₂CH₂—.

8. A light-sensitive photographic element according to claim 5 wherein said cyan image dye-providing compound is represented by the following formula:

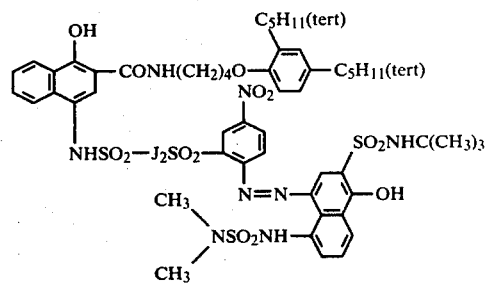

wherein J² represents a bivalent group selected from

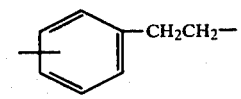

and —CH₂CH₂CH₂—.

9. A light-sensitive photographic element according to claim 4 wherein, in formula [I], m equals 1, and J¹ represents a bivalent group

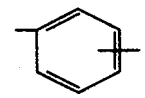

and J² is a bivalent group selected from

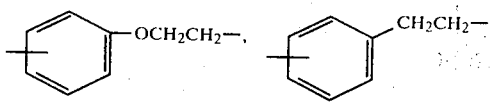

and —CH₂CH₂CH₂—.

10. A light-sensitive photographic element according to claim 9 wherein $R^1$ and $R^2$ in formula [I] are the same and each is a methyl group or ethyl group.

11. A light-sensitive photographic element according to claim 1 wherein said Car represents a group having following formula [IV]:

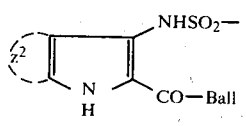

wherein Ball represents an organic ballast group having sufficient atoms to render the compound nondiffusible during processing in an alkaline processing composition and $z^2$ represents a group of carbon atoms necessary for completing a benzene ring.

12. A light-sensitive photographic element according to claim 11 wherein said Car represents a group having the following formula:

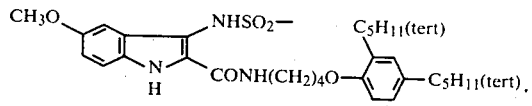

13. A light-sensitive photographic element according to claim 12 wherein $R^1$ and $R^2$ in formula [I] independently represent a methyl group or an ethyl group.

14. A light-sensitive photographic element according to claim 1 wherein, in formula [II], m equals 0 and $J^2$ is a bivalent group selected from

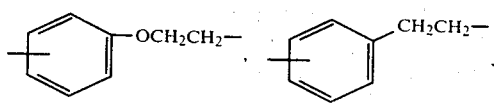

and —CH₂CH₂CH₂—.

15. A light-sensitive photographic element according to claim 14 wherein said cyan image dye-providing compound is represented by the following formula:

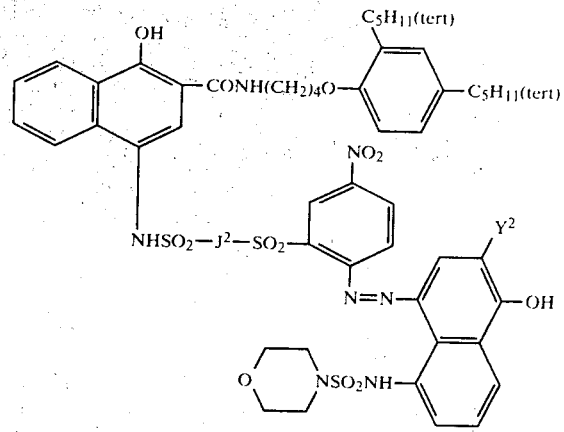

wherein $Y^2$ represents a hydrogen atom or a group —SO₂NHC(CH₃)₃ and $J^2$ represents a bivalent group selected from

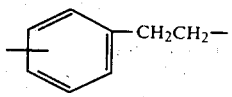

and —CH₂CH₂CH₂—.

16. A light-sensitive photographic element according to claim 14 wherein said cyan image dye-providing compound is represented by the following formula:

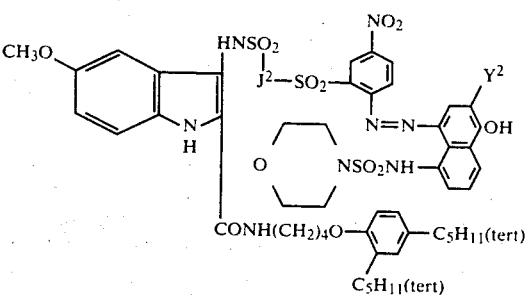

wherein $Y^2$ represents a hydrogen atom or a group —SO₂NHC(CH₃)₃ and $J^2$ represents a bivalent group selected from

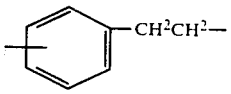

and —CH₂CH₂CH₂—.

17. A light-sensitive photographic element according to claim 1 wherein, in formula [II], m equals 1, $J^1$ represents a bivalent group

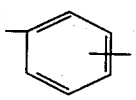

and $J^2$ is a bivalent group selected from

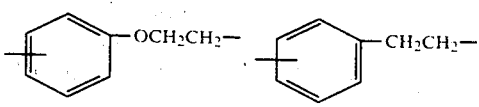

and CH₂CH₂CH₂—.

* * * * *